Figure 1:
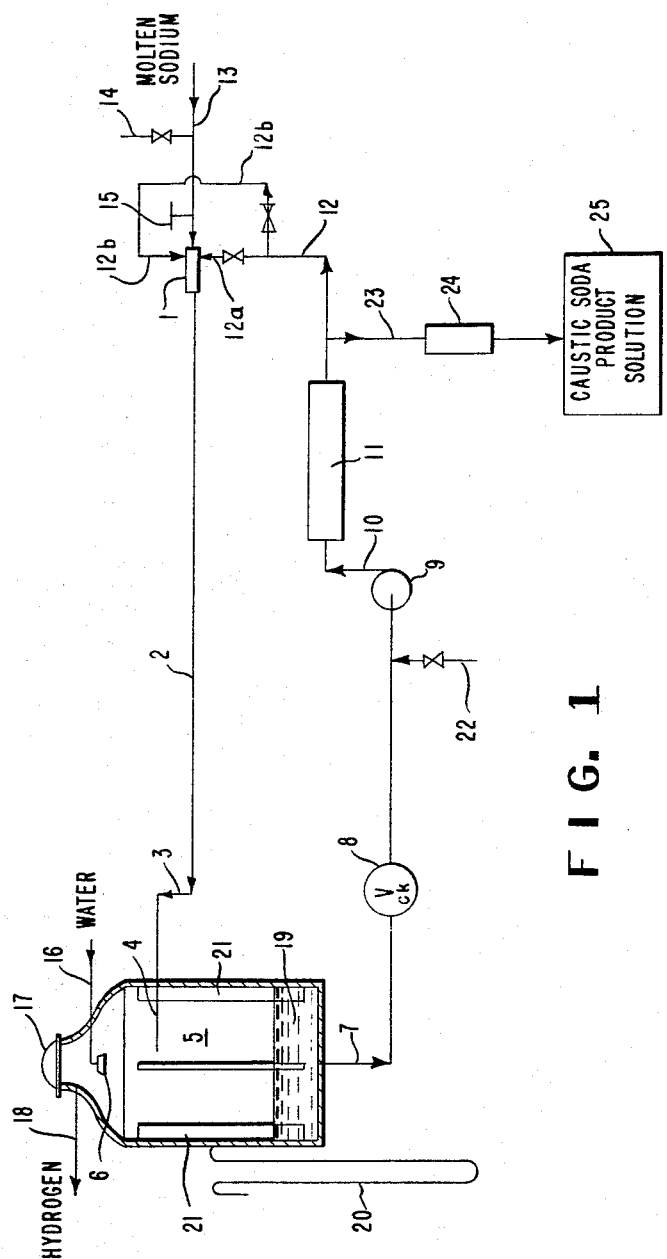

INVENTORS
WILLIAM R. JENKS
NORMAN R. LEVINS

INVENTORS
WILLIAM R. JENKS
NORMAN R. LEVINS

BY Amos G. Cole
AGENT

United States Patent Office 3,287,085
Patented Nov. 22, 1966

3,287,085
CONVERSION OF SODIUM OR POTASSIUM TO ITS HYDROXIDE OF CYANIDE
William R. Jenks, Memphis, and Norman R. Levins, Hixson, Tenn., assignors to E. I. du Pont de Nemours and Company, Wilmington, Del., a corporation of Delaware
Filed Oct. 15, 1963, Ser. No. 316,282
8 Claims. (Cl. 23—79)

This invention relates to reactions involving alkali metals and particularly to a method for reacting such metals so as to produce hydrogen and alkali metal hydroxide or cyanide reaction products.

Alkali metals are of course known to react with water to produce metal hydroxides and hydrogen. Such reactions are highly exothermic and generally regarded as dangerous. So far as we are aware, no method has heretofore been proposed whereby such reactions can be safely and practically carried out to obtain efficiently, valuable metal hydroxide and hydrogen products.

It is an object of the invention to provide a safe and practical method for reacting alkali metals and water directly to obtain the metal hydroxides and hydrogen as valuable products. A particular object is to provide a safe and efficient method for reacting sodium and water to obtain high strength caustic soda solutions and high purity hydrogen as products. A further and special object is to provide a safe and practical way of reacting, in effect, sodium and hydrogen cyanide in a water solution to obtain as products high purity hydrogen and sodium cyanide, wherein the heat of reaction is utilized to evaporate water from the original product cyanide solution to give a dry cyanide product. Still further objects will be apparent from the following description.

The objects of the invention are attained by continuously cycling a stream of an aqueous alkali metal hydroxide or cyanide solution in a confined cyclic flow path which includes as a part thereof a pipeline reactor through which the solution is forced under turbulent flow at a solution velocity of at least 1.3 ft./sec.; continuously injecting into the pipeline reactor in the direction of flow of the stream of solution therein a stream of molten alkali metal having initially a diameter not exceeding $\frac{1}{16}$ in.; continuously separating product hydrogen from the recycling solution stream flowing from the reactor; continuously removing from the system as product part of the recycle solution stream from which the hydrogen has been separated; continuously feeding the residual recycle solution stream into the pipeline reactor at right angle to and symmetrically about the stream of molten metal at the point of injection of the latter; and continuously feeding to the recycling solution stream at a point in the cycle exterior of the reactor water at such a rate as will maintain constant the water content of the residual recycle solution being fed to the reactor. The relative rates of delivery of the recycling solution and the alkali metal to the reactor should be such as will provide a weight ratio of water to alkali metal of at least 35/1.

When the method of the invention is practiced to make an alkali metal hydroxide, the solution that is cycled in the cyclic flow path is a solution of the hydroxide of the alkali metal being used and the product solution that is removed is a solution of that hydroxide. When the method is practiced to make a cyanide, the cycling solution is that of the cyanide of the metal used, and the product solution removed is a solution of that cyanide, which preferably also will contain a small amount of the hydroxide for reasons explained below. Also, when producing a cyanide, there will be continuously fed to the recycling solution from which the hydrogen has been separated hydrogen cyanide at a rate not exceeding that rate which is stoichiometrically equal to the rate at which the alkali metal is fed to the reactor.

If a solid cyanide product is desired, the product cyanide solution removed from the cyclic system is preferably fed to a vacuum crystallizer, the cyanide which is crystallized in the crystallizer is separated, and the resulting mother liquor is returned to the cyclic system for recycling to the pipeline reactor. When operating under preferred conditions, the heat resulting from the reactions occurring in the cyclic system will be sufficient to effect evaporation and crystallization of the withdrawn product solution so that solid commercial quality cyanide product can be readily obtained without the use of heat from external sources.

The invention will be more readily apparent from the attached drawing and from the ensuing description with reference thereto. Although the description is directed primarily to operations employing sodium to make caustic soda or sodium cyanide, it will be readily apparent that other alkali metals, such as potassium, can be employed in similar operations to make the corresponding hydroxides and cyanides.

Figure 2:
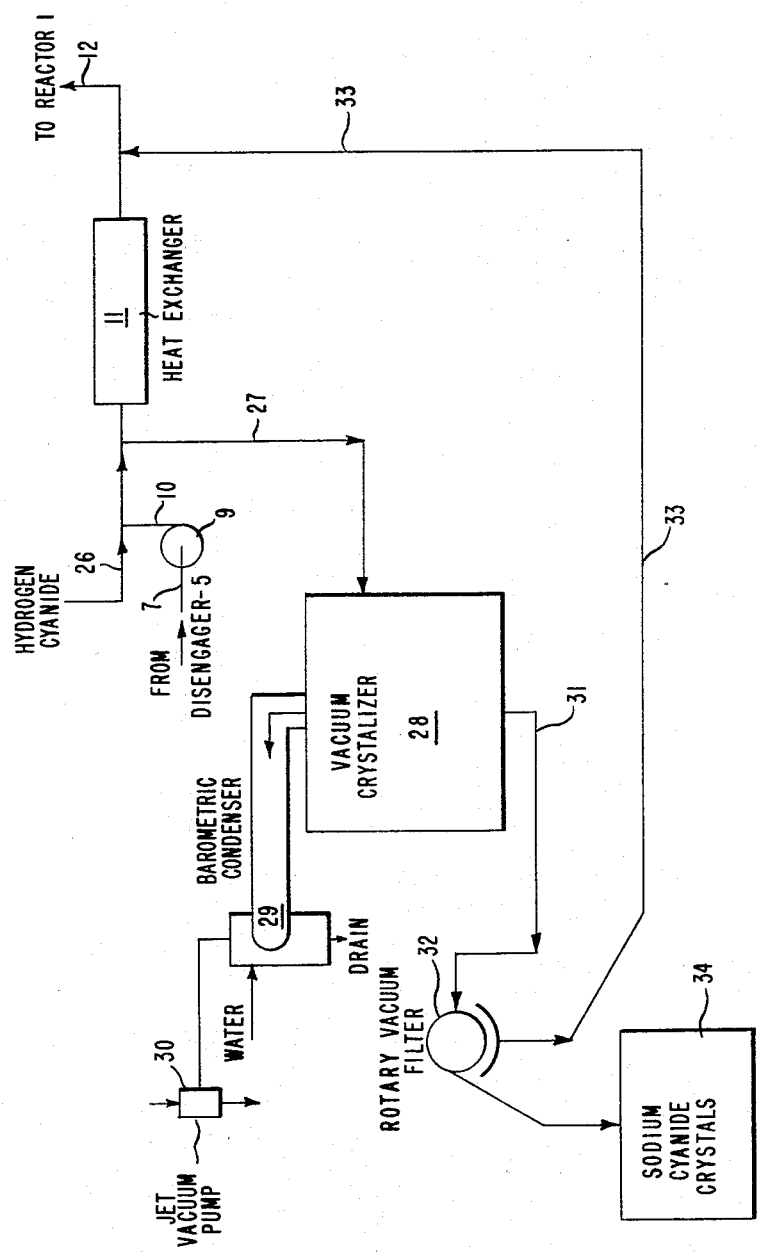

In the drawing:

FIGURE 1 is a schematic representation of a cyclic reaction system which is usable to produce an alkali metal hydroxide in accordance with the invention; and FIGURE 2 is a schematic representation of that portion of the cyclic system of FIGURE 1 which has been modified so as to render the system useful in the production of an alkali metal cyanide in accordance with the invention.

Referring to FIGURE 1, the cyclic flow path through which the caustic sodal solution is cycled includes the pipeline reactor consisting of main reaction section 1 and finishing reaction sections 2 and 3; line 4; disengager 5; line 7, with check valve 8 therein; pump 9; line 10, heat exchanger 11; and return line 12, which divides into lines 12a and 12b before completing the cycle. In operation, cyclic flow of a caustic soda solution is effected by pump 9, the flow being at such a rate as to cause turbulent flow of the solution through the pipeline reactor at a solution velocity of at least 1.3 ft./sec. Sections 1, 2 and 3 of the reactor will generally be of the same general diameter pipe or tubing, section 1 being shown in the drawing in enlarged form simply to show more clearly the fore-part of the reactor where the sodium is injected, where the recycle caustic soda solution is fed, and where the reaction between the sodium and the solution is almost completed. Molten sodium, which preferably has been filtered, is fed at a temperature, e.g., 100–150° C. via line 13 through an injection nozzle (not shown) into the end of the reactor so as to inject one or more streams of liquid sodium in a direction generally paralleling the flow of caustic soda solution therein. Any suitable nozzle which will deliver sodium streams each initially having a diameter not exceeding $\frac{1}{16}$ in. can be used. The use of streams of a diameter not exceeding $\frac{1}{16}$ in. is important if not essential in order to insure complete, smooth, quiet and safe reaction. Much finer streams can be used but those of a diameter less than $\frac{1}{64}$ in. generally are not preferred because orifices delivering them are too prone to plugging. A preferred type of nozzle is one which delivers multiple streams each of a diameter of $\frac{1}{32}$ to $\frac{1}{16}$ in. and which includes a valve mechanism having a flush-wall seat-sleeve permitting shut off at approximately the delivery end of the nozzle. A combined spray nozzle and valve of the preferred type is described in the copending application of Inman, Serial No. 280,697, filed May 15, 1963.

Recycle solution line 12 is shown as splitting into lines 12a and 12b which deliver streams of the recycle solution at equal rates from opposite sides of the injected sodium stream and at right angle thereto, whereby recycle solution is delivered symmetrically and in balanced fashion about the sodium stream at about the point of injection of the later. A non-balanced delivery of the recycle solution allows hydrogen pockets to accumulate which results in uncontrolled, unpredictable and erratic reaction with pressure rise and dangerous and destructive "water-hammer-like" effects. If desired, the recycle solution can be delivered to the reactor by way of multiple pairs of feed lines instead of a single pair such as lines 12a and 12b. However, the delivery should always be such that the stream from each such feed line meets the sodium stream at a right angle (90°) thereto, with each such stream being opposed by an oppositely directed stream, and with the rates of flow of all such streams being equal. In general, a single pair of feed lines such as lines 12a and 12b delivering stream at equal rates from diametrically opposite sides and at right angle to the sodium stream gives excellent results and is preferred.

The configuration of the pipeline reactor 1, 2 and 3 is of considerable importance. Its diameter should be such that at the flow rates to be employed the solution flow therethrough will be turbulent. While nearly the entire reaction of sodium with water will occur in the first short section, the over-all length of the reactor should be considerable, e.g., at least about 10 ft., in order to insure complete reaction of all the sodium. It is also highly desirable for the same reason that the downstream portion of the reactor include at least two right angle bends to provide an upward displacement which assures that the initial straight run portion of the reactor will always be filled with liquid.

The reacted two phase stream of caustic soda solution and hydrogen is delivered by line 4 tangentially into the vapor space of disengager 5. Tangential delivery is important to provide good disengaging of the hydrogen and to prevent foaming. Disengager 5 is provided with a number of baffles 21 which are positioned generally vertically and uniformly spaced about the perimeter of disengager 5. Four such baffles are indicated in the drawing. While make-up water can be fed to the cyclic stream at any point in the cycle, it is generally most desirable that it be fed to disengager 5, e.g., by line 16 terminating in spray head 6. Make-up water sprayed into the system in this manner serves to cool and wash the disengaged hydrogen as it leaves the system by way of line 18.

The caustic soda solution from which hydrogen has been disengaged accumulates at 19 in disengager 5, from whence it is withdrawn via line 7, having check valve 8 therein, by the action of pump 9. It is then forced by pump 9 through line 10 and heat exchanger 11 (where it may be heated or cooled, generally the latter) and then back to the reactor by way of line 12 and lines 12a and 12b. Part of the recycle caustic soda stream is withdrawn from the cyclic stream at a point outside of the reactor, the withdrawal generally being most desirable at a point downstream from heat exchanger 11, e.g., by way of line 23 having a cooler 24 therein. The withdrawn product solution may be stored for future use in vessel 25, or it may be passed directly to a point of use or to an evaporator if solid caustic soda is desired.

Before starting the injection of sodium, circulation of water or caustic soda solution through the system should be initiated while purging air from the system, e.g., by means of a stream of inert gas such as nitrogen delivered by line 14. The system is operated at a temperature sufficiently high to keep essentially all of the caustic soda in solution but not exceeding the boiling point of the solution being recycled. When caustic soda is to be a final product, the temperature of the solution delivered to disengager 5 will preferably be in the range from 50° C., most preferably 90° C., to just below the boiling point of the solution, the latter temperature being most preferred. Temperatures substantially lower than 50° C. can be employed, particularly when relatively dilute caustic soda solutions are desired as product. Operation at the boiling point is possible but is not preferred since at such temperature it is difficult to prevent the formation of smoke (sodium oxide and caustic soda) which will contaminate the hydrogen product.

Since the reaction:

(1) $\quad H_2O + Na \rightarrow NaOH + \frac{1}{2}H_2$ produces 84,000 B.t.u. per pound mole of sodium reacted, considerable heat must generally be removed from the cyclic system. The make-up water fed to the system will absorb some of the heat, but temperature control is effected mostly by heat exchanger 11. Operation at the highest practical temperature so as to provide a high temperature differential between the circulating solution and the cooling fluid in heat exchanger 11 gives maximum cooling efficiency and minimizes the sizes of heat exchanger required. Nickel with polytetrafluoroethylene gaskets are generally preferred as construction materials because of their excellent resistance to corrosion by hot caustic soda solutions. However, other materials such as stainless steel can be used when minor contamination of the product with iron impurities can be tolerated.

The fact that hydrogen is generated and expanded by the heat of the reaction of sodium with water presents difficult control problems. It is essential, of course, that the system be free of oxygen in order to prevent formation of explosive oxygen-hydrogen mixtures. This is accomplished by (a) purging the system with nitrogen at start up, by (b) operating under a pressure, e.g., 5 to 15 p.s.i.g., sufficiently above atmospheric pressure to assure against air being sucked into the system, and (c) by the continuous withdrawal of hydrogen and product solution from the system. With these precautions and by operating in the manner indicated below, the reactions involved can be carried out safely and in a very efficient and practical way. Nevertheless, it is prudent from the safety standpoint in order to guard against major damage in the event of possible equipment or control failure to provide rupture discs such as elements 15 and 17, a water seal leg such as element 20 which will blow out in the event of minor explosions, and an emergency pressure water purge 22 with controls to effect automatic flow of purge water into the system should pump 9 fail while sodium injection continues, thereby assuring continuous adequate flow of water through the reactor.

It is essential that the injected sodium be reacted rapidly, smoothly and continuously and that free or excessive sodium not be permitted to accumulate anywhere in the system. This requires that water always be present in excess. This is difficult to assure since a particle of sodium reacting with water tends to develop a surrounding insulating enclosure of hydrogen. Accumulation of such insulated particles produces localized areas of excess sodium which often results in uncontrolled subsequent reaction with devastating effect. This possibility is eliminated by bringing the sodium and water reactants together in the manner explained above and illustrated in FIGURE 1, and by assuring that water is continuously supplied in adequate amount e.g., in the form of recycled solution, at the point of injection of the sodium. On a weight basis, the ratio of the rate of supply of water (e.g., as caustic soda solution) to the rate of injection of sodium should be at least 35/1. Much higher proportions of water can of course be employed depending upon the desired concentration of the product caustic soda solution. Maintaining a weight ratio of water to sodium of at least 35/1, and preferably at least 60/1, is also important in preventing the appearance of white smoke in the by-product hydrogen and a solution velocity of at least 1.3 ft./sec. has been found to be essential. Solution velocities of at least 1.5, e.g., 1.5 to 2.5, are preferred. Such smoke, when formed, is very difficult to scrub from the hydrogen, hence, prevention of its formation is important when the hydrogen is to be used for purposes where such smoke impurities cannot be tolerated.

The molten or liquid sodium should be injected into the eractor under a pressure substantially greater than that existing in the reactor in order to prevent back flow of solution into the sodium line where reaction of water with the sodium could develop destructive pressures. A pressure differential of at least 10 p.s.i.g. is generally desirable.

The water content of the solution in the cycle should of course be sufficient to make it readily flowable. The water content of the solution generally will range from about 27 to 94% by weight with the caustic soda content ranging from 6 to 73% when caustic soda is the intended product. The preferred contents are 27 to 75% water and 73 to 25% caustic soda.

FIGURE 2 indicates the modifications in the system of FIGURE 1 when using the system to produce an alkali metal cyanide product. The reactions to produce sodium cyanide are as follows:

(1) $\quad Na + H_2O \rightarrow NaOH + \tfrac{1}{2}H_2$
(2) $\quad NaOH + HCN \rightarrow NaCN + H_2O$ The summation of the two reactions is:

(3) $\quad Na + HCN \rightarrow NaCN + \tfrac{1}{2}H_2$

Thus, except for the water removed with the cyanide product, no make-up water is required. The over-all effect is as though sodium were reacted directly with hydrogen cyanide according to reaction (3). It is known that such direct reaction can be made to occur but the very high temperatures required makes it impractical. By the present method involving reactions (1) and (2) in sequence, the net effect of a single direct reaction can be readily and efficiently achieved at relatively low temperature.

In the embodiment illustrated by FIGURE 2, hydrogen cyanide is fed continuously by way of line 26 into line 10 of the cyclic system. The hydrogen cyanide may be fed in either gaseous or liquid form, the latter being preferred. It reacts instantaneously with the caustic soda present in the solution to form sodium cyanide. Part of the resulting solution of the latter is recycled via heat exchanger 11, line 12 and lines 12a and 12b back to the pipeline reactor while the remainder is withdrawn from the cycle and feed via line 27 to vacuum crystallizer 28. Under the reduced pressure provided by barometric condenser 29 in conjunction with jet vacuum pump 30, the hot cyanide solution is concentrated in crystallizer 28 to produce a sodium cyanide crystal slurry which flows by line 31 to rotary vacuum filter 32 where the crystals are separated. The filtrate is recycled via line 33 to line 12 of the cyclic system while the crystal product wet with mother liquor may be passed to storage vessel 34, or to a drier, or used directly.

The above considerations respecting the solution velocicty through the reactor and the relative rates of the feeds of water, as recycle solution) and metal to the reactor also apply when the system is used to produce a metal cyanide. When producing a cyanide, the recycling solution will of course be a metal cyanide solution and hydrogen cyanide will be injected into the recycling solution generally at a rate substantially equal to but not exceeding that rate which is stoichiometrically equal to the rate at which alkali metal is injected into the reactor. The hydrogen cyanide feed reacts instantly with the metal hydroxide formed in the pipeline reactor and converts it to the metal cyanide. Of course, if only part of the metal hydroxide formed in the pipeline reactor is to be converted to cyanide, the rate at which hydrogen cyanide is fed will be correspondingly reduced. When sodium cyanide is being made, the composition of the solution recycled to the pipeline reactor generally will contain, on a weight basis, 27 to 94% water, 1 to 60% caustic soda and 5 to 60% sodium cyanide. No free or excess hydrogen cyanide should be present. The preferred compositions are 48 to 55% water, 2 to 4% caustic soda and 40 to 48% sodium cyanide. The most preferred composition is about 52% water, 4% caustic soda and 44% sodium cyanide, since the feeds of materials to the system are such as to maintain that composition, the heat produced by the reactions will result in the temperature of the cyanide product solution fed to crystallizer 28 being sufficient to effect concentration and crystallization of the cyanide product without supplying any heat from external sources. Such a thermally balanced system is highly desirable in practical applications.

Dilute or concentrated aqueous metal cyanide solutions are useful and desired for some purposes and the system can be used to produce such solutions as products. When producing dry cyanide product, it is generally desirable that the solution from which the cyanide is crystallized contain a small concentration, e.g., 2–4%, alkali metal hydroxide so that drying of crystals wet with mother liquor will yield dry metal cyanide containing 0.3 to 0.8% metal hydroxide, the presence of which is required when a white dry product is desired.

When the system is employed to produce an alkali metal cyanide product, it is essential that the temperature never exceed 80° C. anywhere in the system, otherwise substantial decomposition of the cyanide will result. While temperatures below 50° C. can be used, temperatures of 50 to 80° C. are preferred with those of 65 to 75° C. being most preferred.

The invention is illustrated by the following examples in which all composition percentages are by weight.

EXAMPLE 1

Caustic soda solution was prepared in several runs employing a cyclic system containing 150 gallons of circulating solution. The system was generally the same as that of FIGURE 1 except that cooler 24 was omitted. In all runs, the diameter of the delivery hole of the sodium spray nozzle did not exceed 0.029 in. In two runs the nozzle was provided with a 60° cone to give a fine dispersed spray while in the remaining runs a single straight stream of sodium 0.029 in. in diameter was delivered. The results are shown in Table 1.

*Table 1*

|  | Run 1 | Run 2 | Run 3 | Run 4 |
|---|---|---|---|---|
| Type of Na Spray Nozzle | Cone | Cone | Single stream | Single stream. |
| Na Spray Pressure, p.s.i.g | 40 | 55 | 25 | 40. |
| Na Spray Rate, lb./hr | 19 | 7 | 18 | 32. |
| Reactor Diameter, in | 1 | 1 | ¾ | 1. |
| Solution flow to reactor, g.p.m | 2–3 | 3–6 | 4 | 3–6. |
| Solution Velocity in the Reactor, ft./sec. | 0.8–1.2 | 1.2–2.4 | 1.6 | 1.2–2.4. |
| Water flow to reactor, lbs./hr | 720–1,100 | 1,100–2,200 | 1,440 | 1,100–2,200. |
| Wt. ratio, water feed/Na feed | 38/1–57/1 | 155/1–310/1 | 80/1 | 34/1–68/1. |
| Temp. of solution from reactor, °C | 112 | 120 | 118 | 132.[1] |
| Time of run, Min | 34 | 63 | 28 | 37. |
| Appearance of white smoke | Entire run | Faint at solution Vel. of 1.2. | None | Intermittent and faint. |

[1] Boiling temperature.

EXAMPLE 2

Several runs producing caustic soda solution were carried out employing a 1 in. diameter pipeline reactor in the cyclic system of FIGURE 1 containing 10 gallons of circulating caustic soda solution. The sodium injection nozzle employed delivered a single straight jet of liquid sodium 0.029 in. in diameter. Results are shown in Table 2.

Table 2

|  | Run 5 | Run 6 | Run 7 | Run 8 [1] |
|---|---|---|---|---|
| Solution flow to reactor, g.p.m. | 6 | 4 | 4 | 5.5 |
| Water flow to reactor, lbs./hr. | 1,900 | 1,290 | 1,420 | 1,950 |
| Solution Velocity in the Reactor, ft./sec. | 2.4 | 1.6 | 1.6 | 2.2 |
| Na feed rate, lbs./hr. | 27 | 32 | 18 | 33 |
| Wt. ratio, water feed/Na feed | 70/1 | 40/1 | 79/1 | 60/1 |
| Temp. of solution to reactor, °C. | 120 | 115 | 140 | 82–142 |
| Temp. of solution from reactor, °C. | 134 | 137 | 140 | 105–142 |
| Na pressure, p.s.i.g. | 32 | 37 | 22 | 35 |
| Make-up water feed, lbs./hr. | 70 | 83 | 120 | 70–160 |
| Product withdrawn, lbs./hr. | 46.5 | 55 | 31 | 57 |
| Product analysis: |  |  |  |  |
| Percent NaOH | 55.2 | 56.5 | 50.3 | 50.6 |
| Percent Na$_2$CO$_3$ | 1.1 | 0.5 | 0.5 | 0.4 |
| Time of run, min. | 42 | 40 | 35 | 38 |
| Appearance of white smoke | None | None | [2] | [3] |

[1] Run 8 was operated part time at the boiling point of the recycling caustic soda solution.
[2] Essentially none.
[3] Faint only during boiling.

EXAMPLE 3

The cyclic system of Example 1 was modified in accordance with FIGURE 2 except that crystallizer 28 and filter 32 were omitted so that the product cyanide was withdrawn as a solution via line 27. In the operation, the hydrogen cyanide reactant was fed as a liquid into the recycling cyanide solution via line 26 and the sodium injection nozzle delivered a single straight jet of liquid sodium 0.029 in. in diameter. Details of the operation and the results are shown in Table 3.

Table 3

| | |
|---|---|
| Solution flow to reactor, g.p.m. | 5.5 |
| Water flow to reactor, lbs./hr. | 2,400 |
| Velocity of Solution in the Reactor, ft./sec. | 2.2 |
| Na feed rate, lbs./hr. | 29 |
| Wt. ratio water feed/Na feed | 83/1 |
| Temp. of solution to reactor, 0°C. | 60 |
| Temp. of solution from reactor, 0°C. | 74 |
| Make-up water feed, lbs./hr. | .160 |
| Appearance of white smoke | None |
| Length of run, Min. | 43 |

The hydrogen produced was scrubbed with water at 36°C. and the rate of cyanide pick-up in the scrubber was only 7×10$^{-5}$ lbs./hr. (as HCN). The cyanide content of the scrubbed hydrogen was only 0.003%, calculated as HCN. The compositions of the original 10 gallons of cyanide solution charged to the cyclic system and of the cyanide solution withdrawn as product were as follows:

| | Original Solution | Product Solution |
|---|---|---|
| NaCN, percent | 32.70 | 22.17 |
| NaOH, percent | 7.16 | 12.81 |
| Na formate, percent | 0.41 | 0.42 |

The above results show that sodium cyanide solution can be produced effectively and continuously by the method of the invention without substantial formation of formate resulting. When operating under preferred conditions with the temperature of the cycle solution about 73°C. as it leaves the reactor and employing a recycle solution containing 52% water, 44% NaCN and 4% NaOH, the heat and water contents of the product solution withdrawn will be such as to permit flashing off the water under vacuum without heat from external sources to yield crystalline cyanide product.

The present invention provides a highly practical and economical method for producing alkali metal hydroxides by the direct reaction of alkali metals and water. When hydrogen cyanide is also employed as a reactant, alkali metal cyanides can be efficiently and safely produced by reactions involving only the alkali metal and hydrogen cyanide as raw materials.

The embodiments of this invention in which an exclusive property or privilege is claimed are as follows:

1. The method of producing hydrogen and a hydroxide of a metal of the group consisting of sodium and potassium, said method comprising:

(a) continuously cycling a stream of an aqueous solution of said hydroxide at a temperature from about 50°C. to just below the boiling point of said solution in a confined cyclic flow path which includes as a part thereof a pipeline reactor through which said solution is forced, under turbulent flow at a velocity of at least 1.3 ft./sec.;

(b) continuously injecting into said stream in said reactor in a direction of flow of said stream therein a molten stream of said metal having initially a diameter not exceeding 1/16 in. at a flow rate such that the relative rates of flow to said reactor of said aqueous solution and said metal will provide a weight ratio of water to metal of at least 35/1, thereby reacting in said reactor said metal and said solution to produce a two-phase stream of hydrogen and a solution of the hydroxide of said metal;

(c) continuously passing said two-phase stream into a disengager whereby said hydrogen is separated from said solution stream, and continuously removing the separated hydrogen from said cyclic flow path;

(d) continuously withdrawing from said cyclic flow path part of the recycle solution stream as a product solution of said metal hydroxide;

(e) continuously feeding the remainder of said recycle solution stream into said reactor at right angle to and symmetrically about said stream of metal at about the point of injection of the latter;

(f) and continuously feeding into said recycle solution stream water at such a rate as will maintain substantially constant the water content of said recycle solution stream being fed to said reactor.

2. The method of claim 1 wherein the velocity of the solution in the reactor is at least 1.5 ft./sec., and wherein the metal is injected into, and the solution stream is recycled to, the reactor at such relative rates as will provide a weight ratio of water to metal of at least 60:1.

3. The method of claim 1 wherein the metal is sodium and the product solution that is withdrawn is a caustic soda solution containing 25 to 73% NaOH by weight.

4. The modification of the method of claim 1 wherein hydrogen cyanide is continuously fed into the recycle solution stream at a rate not exceeding that stoichiometrically equal to the rate of injection of the metal in step (b), whereby the metal hydroxide produced in the reactor is converted by reaction with said hydrogen cyanide to the cyanide of the metal; wherein the product solution withdrawn in step (d) and the recycle solution fed into the reactor in step (e) are solutions of the cyanide of the metal; and wherein the solution cycled in the flow path is cycled therein at a temperature from about 50°C. up to but not exceeding 80°C.

5. The method of claim 4 wherein the velocity of the solution in the reactor is at least 1.5 ft./sec., and wherein the metal is injected into, and the solution stream is recycled to, the reactor at such relative rates as will provide a weight ratio of water to metal of at least 60/1.

6. The method of claim 4 wherein the metal is sodium and wherein the product solution that is withdrawn contains, on a weight basis, 27 to 94% water, 1 to 60% caustic soda and 5 to 60% sodium cyanide.

7. The method of claim 4 wherein the temperature is 65 to 75° C. and the metal is sodium, and wherein the product solution that is withdrawn contains, on a weight basis, 48 to 55% water, 2 to 4% caustic soda and 40 to 48% sodium cyanide.

8. The method of claim 4 wherein the temperature is 65 to 75° C. and the metal is sodium, wherein the product solution that is withdrawn contains, on a weight basis, about 52% water, about 4% caustic soda and about 44% sodium cyanide, and wherein the withdrawn product solution is concentrated under vacuum to crystallize sodium cyanide therefrom.

References Cited by the Examiner

UNITED STATES PATENTS

| | | | |
|---|---|---|---|
| 2,527,443 | 10/1950 | Padgitt | 23—184 |
| 2,876,066 | 3/1959 | Inman | 23—79 |
| 2,993,754 | 7/1961 | Jenks et al. | 23—79 |
| 3,015,539 | 1/1962 | Snyder | 23—79 |

OTHER REFERENCES

Moeller: Inorganic Chemistry, John Wiley & Sons., Inc., New York, 1952.

OSCAR R. VERTIZ, *Primary Examiner.*

MAURICE A. BRINDISI, *Examiner.*

J. J. BROWN, *Assistant Examiner.*